(12) United States Patent
Bart et al.

(10) Patent No.: US 8,919,133 B2
(45) Date of Patent: Dec. 30, 2014

(54) DOUBLE-BODY GAS TURBINE ENGINE PROVIDED WITH AN INTER-SHAFT BEARING

(75) Inventors: Jacques René Bart, Soisy sur Seine (FR); Didler René André Escure, Nandy (FR); Ornella Gastineau, Paris (FR)

(73) Assignee: Snecma, Paris (FR)

( * ) Notice: Subject to any disclaimer, the term of this patent is extended or adjusted under 35 U.S.C. 154(b) by 525 days.

(21) Appl. No.: 13/260,152

(22) PCT Filed: Apr. 15, 2010

(86) PCT No.: PCT/EP2010/055003
§ 371 (c)(1),
(2), (4) Date: Oct. 14, 2011

(87) PCT Pub. No.: WO2010/119115
PCT Pub. Date: Oct. 21, 2010

(65) Prior Publication Data
US 2012/0017603 A1 Jan. 26, 2012

(30) Foreign Application Priority Data

Apr. 17, 2009 (FR) .................................... 09 52515

(51) Int. Cl.
*F02C 3/10* (2006.01)
*F02C 7/06* (2006.01)
*F01D 25/16* (2006.01)
*F02C 7/20* (2006.01)
*F02K 3/06* (2006.01)
*F02K 3/02* (2006.01)

(52) U.S. Cl.
CPC . *F01D 25/16* (2013.01); *F02C 7/06* (2013.01); *F02K 3/06* (2013.01); *F05D 2240/50* (2013.01); *F05D 2230/60* (2013.01)

USPC ............... 60/792; 60/226.1; 60/796; 60/797; 415/229

(58) Field of Classification Search
USPC ........ 60/226.1, 792, 796, 797; 244/54, 118.2; 248/554; 415/66, 68, 69, 229
See application file for complete search history.

(56) References Cited

U.S. PATENT DOCUMENTS 3,823,553 A * 7/1974 Smith ............................. 60/791
4,378,197 A   3/1983 Cattaneo et al.
(Continued)

FOREIGN PATENT DOCUMENTS

EP      0 335 779      10/1989
EP      0 389 353      9/1990
(Continued)

OTHER PUBLICATIONS

International Search Report Issued Jun. 25, 2010 in PCT/EP10/055003 Filed Apr. 15, 2010.

*Primary Examiner* — Ehud Gartenberg
*Assistant Examiner* — Arun Goyal
(74) *Attorney, Agent, or Firm* — Oblon, Spivak, McClelland, Maier & Neustadt, L.L.P.

(57) ABSTRACT

A double-body gas turbine engine, including a low-pressure body LP and a high-pressure body HP, rotatably mounted about a single shaft in a stationary casing, the low-pressure body LP including a compressor and a turbine connected by a low-pressure shaft LP. The low-pressure shaft LP is supported by an upstream LP bearing, a first downstream LP bearing, and an additional downstream LP bearing by the stationary casing, the high-pressure body being supported by an upstream HP bearing and a downstream HP bearing which is an inter-shaft bearing including an inner track rigidly connected to the HP turbine rotor and an outer track rigidly connected to the LP shaft.

9 Claims, 5 Drawing Sheets

(56) References Cited

U.S. PATENT DOCUMENTS

| | | |
|---|---|---|
| 4,558,564 A | 12/1985 | Bouiller et al. |
| 4,884,903 A | 12/1989 | Pham et al. |
| 5,074,109 A | 12/1991 | Mandet et al. |
| 6,708,482 B2 * | 3/2004 | Seda .................... 60/226.1 |
| 6,732,502 B2 * | 5/2004 | Seda et al. ............ 60/226.1 |
| 6,883,303 B1 | 4/2005 | Seda |
| 7,097,413 B2 * | 8/2006 | VanDuyn ................ 415/9 |
| 2001/0009592 A1 | 7/2001 | Maquire et al. |
| 2003/0097844 A1 | 5/2003 | Seda |
| 2004/0047731 A1 | 3/2004 | Hull |
| 2006/0201160 A1 | 9/2006 | Richards |
| 2007/0044307 A1 | 3/2007 | Bergerot et al. |

FOREIGN PATENT DOCUMENTS

| | | |
|---|---|---|
| EP | 1 316 676 | 6/2003 |
| EP | 1 396 611 | 3/2004 |
| EP | 1 703 085 | 9/2006 |
| EP | 1 757 777 | 2/2007 |
| FR | 2 484 574 | 12/1981 |
| FR | 2 535 789 | 5/1984 |

* cited by examiner

DOUBLE-BODY GAS TURBINE ENGINE PROVIDED WITH AN INTER-SHAFT BEARING

BACKGROUND OF THE INVENTION

1. Field Of The Invention

The present invention relates to gas turbine engines, notably for aeronautical applications, comprising a low-pressure spool and a high-pressure spool. It is aimed at the layout of the bearings which, within the engine casing, support the LP and HP shafts and, more particularly, at the downstream bearings.

2. Description Of The Related Art

A twin-spool or two-body gas turbine engine comprises a first rotary assembly, known as the low-pressure (BP) spool, formed of a shaft connecting an LP compressor at the upstream end, upstream and downstream being defined with respect to the flow of air through the machine, and an LP turbine at the downstream end. Each of the compressor and turbine elements may be made up of one or more stages. The two LP elements are spaced axially apart and leave a space for a second rotary assembly known as the high-pressure (HP) spool, formed of an HP compressor located downstream of the LP compressor, and of an HP turbine located upstream of the LP turbine. The HP compressor and the HP turbine are mechanically connected to one another by a connecting member in the form of a drum. The combustion chamber of the engine, which is stationary with respect to the two spools, is annular and housed circumferentially around said drum. It receives compressed air from the compressors of the LP stages and of the HP stages in turn, and delivers high-energy combustion gases to the HP and LP turbine stages in turn. The engine may comprise a fan rotor at the front, driven by the shaft of the LP spool. Other layouts are known.

A known engine such as the CFM56 comprises structural casing elements notably supporting the rotary assemblies via bearings. On the upstream side, a casing element, known as the intermediate casing, comprises a hub supporting the LP shaft via an upstream LP bearing. On the downstream side, a casing element known as the exhaust casing also comprises a hub supporting the LP shaft via a downstream LP bearing. The HP spool is supported by the LP shaft on the downstream side using an inter-shaft bearing.

An engine mounted on an aircraft experiences transverse dynamic loadings when the aircraft undertakes direction-change maneuvers. With such a bearing layout and for engine embodiments notably in which the length is great with respect to the slenderness of the shaft of the low pressure LP spool, the present applicant has analyzed the behavior of the HP and LP rotors when the engine is subjected to such maneuvering loadings. The transverse movement of the rotors along the engine axis is a critical parameter inasmuch as this movement has a direct influence on how the clearances between the tips of the blades and the stator rings are taken up. These clearances have to be kept at low values if optimum performance is to be maintained.

BRIEF SUMMARY OF THE INVENTION

The applicant has therefore set itself the objective of reducing the radial clearances at the tips of the compressor and turbine rotor blades under maneuvering loadings.

More particularly, the applicant has set itself the objective of improving the layout of the bearings that support the rotors in a twin-spool gas turbine engine with a view to reducing the transverse movements along the axis of the engine when the engine, mounted on an aircraft, is subjected to maneuvering loadings.

Such an objective is achieved, according to the invention, with a twin-spool gas turbine engine comprising a low-pressure LP spool and a high-pressure HP spool, which spools are mounted so that they can rotate about the same axis in a fixed casing of the engine, the low-pressure spool having an LP compressor and an LP turbine which are connected by a low-pressure LP shaft, said LP shaft being supported by an upstream LP bearing, and a first downstream LP bearing in structural casing elements, the HP spool being supported by an upstream HP bearing and a downstream HP bearing, said engine being characterized in that the LP shaft is supported downstream, in a structural casing element, by an additional downstream LP bearing.

The additional downstream LP bearing, in collaboration with the downstream LP bearing, allows better nesting of the LP shaft with respect to the downstream casing element.

According to another feature, the additional downstream LP bearing is located upstream of said downstream LP bearing. Thus, the additional downstream LP bearing is of a diameter greater than that of said downstream LP bearing.

It is notably also of a diameter greater than that of the downstream HP bearing, the downstream HP bearing being an inter-shaft bearing fitted between the LP shaft and the HP rotor, the HP spool being supported by the LP shaft.

According to one embodiment, the additional downstream LP bearing is positioned axially between the downstream HP bearing and the downstream LP bearing.

According to another embodiment, the downstream HP bearing and the additional downstream LP bearing are positioned in respective transverse planes that are close to one another.

Advantageously, with the downstream LP bearing and the additional downstream LP bearing being supported by the same structural casing element, said structural casing has radial-stiffening means. More particularly, said structural casing element forms the structural exhaust casing.

BRIEF DESCRIPTION OF THE SEVERAL VIEWS OF THE DRAWINGS

Other features and advantages of the invention will become apparent from reading the following description of one embodiment of the invention, given solely by way of nonlimiting example, with reference to the attached drawings in which.

DETAILED DESCRIPTION OF THE INVENTION

Figure 1:
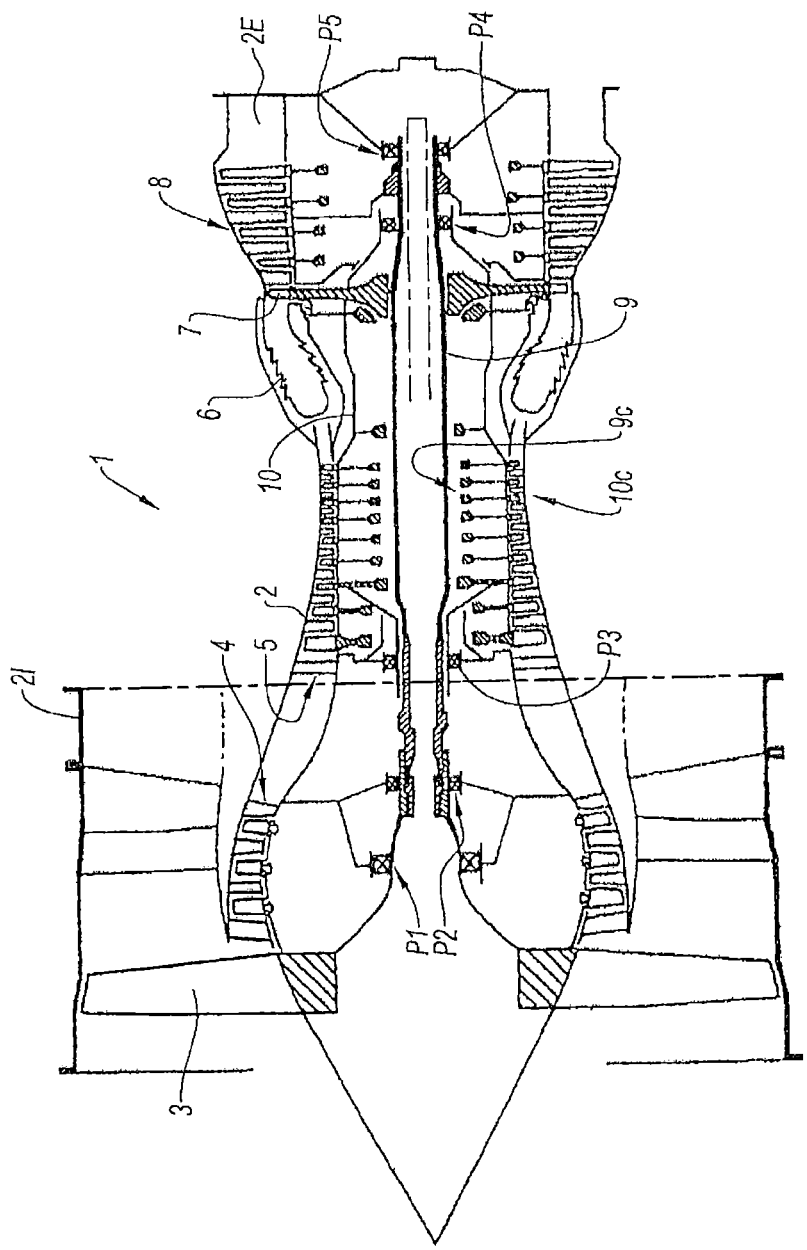
FIG. 1 is a schematic axial half section of a gas turbine engine with a front fan, according to the prior art.

The gas turbine engine 1 of FIG. 1 comprises, inside a casing and from upstream to downstream, a front fan 3 of which some of the air flow that it compresses is ejected into the atmosphere and a radially interior portion is guided through the engine. The latter comprises, in succession, a plurality of compressor stages forming the low-pressure (LP) compressor 4, then the stages of the high-pressure (HP) compressor 5. The air enters a diffuser via which it is admitted into the combustion chamber 6. Downstream of the combustion chamber, the combustion gases are guided through the high-pressure HP turbine 7 then through the stages of the low-pressure LP turbine 8; finally, the gases are ejected into the atmosphere via a jet pipe nozzle not depicted.

Structurally, the rotor of the LP compressor 4 and that of the LP turbine 8 are mechanically connected by an LP shaft 9 thus forming the LP spool 9C. The rotor of the HP compressor 5 and the rotor of the HP turbine 7 form, together with the drum 10 that mechanically connects them, the HP spool 10C. The casing 2, in which the two, LP and HP, spools 9C and 10C are mounted, comprises a plurality of elements including, as far as the present invention is concerned, an upstream casing element known as the intermediate casing 21, and a downstream casing element known as the exhaust casing 2E. These two casing elements are structural inasmuch as the forces between the engine and the structure of the aircraft pass through them. They are formed of a central hub and of radial arms crossing the gas duct that connects the hub to an outer shell ring.

The rotary assemblies are supported in the hubs by a set of bearings; the LP shaft 9 here is connected to the fan shaft which is supported by a bearing P1. The LP shaft 9 is supported on the upstream side by a bearing P2. These two bearings P1 and P2 are themselves supported by the intermediate casing 21. The LP shaft is supported on the downstream side by a bearing denoted P5, itself mounted on the exhaust casing 2E. The HP spool 10C is supported by the LP shaft 9 via the inter-shaft bearing P4, on the downstream side. It is supported on the upstream side by the bearing P3 mounted in the intermediate casing.

Figure 2:
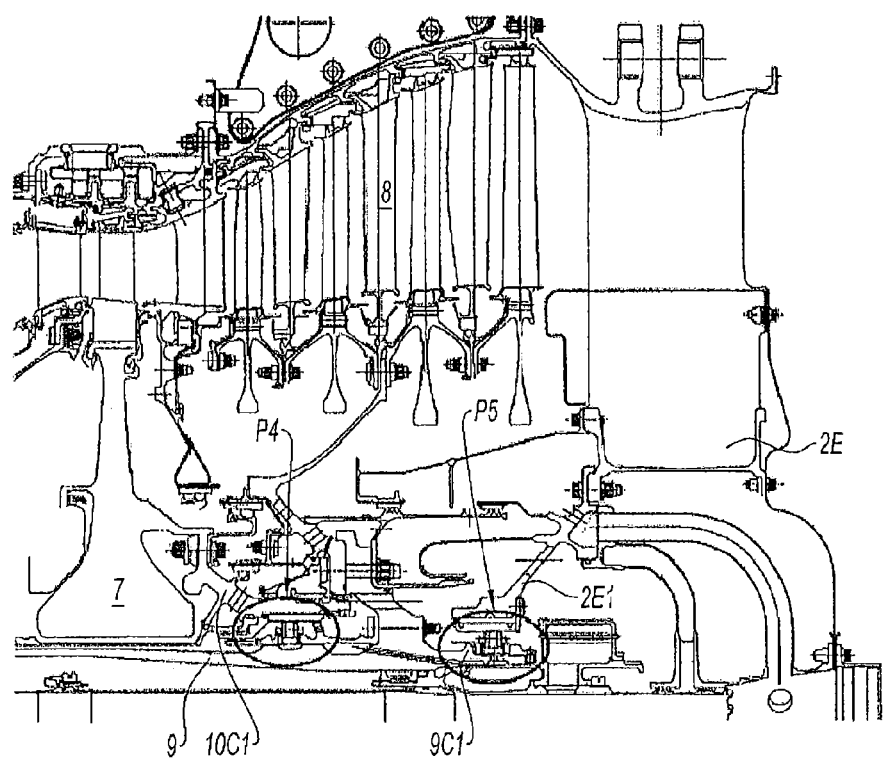
FIG. 2 depicts the downstream part of the engine of FIG. 1 in greater detail.

FIG. 2 shows the rear part of the engine in greater detail. The shaft 9 of the LP spool 9C passes through the disk of the HP turbine 7. It is supported by the bearing P5 in an element 2E1 of frustoconical shape of the hub of the exhaust casing 2E. It comprises a cage with rolling bearings held between an inner raceway secured to an end journal 9C1 of the LP shaft 9 and an outer raceway secured to the frustoconical hub element 2E1. The rotor of the LP turbine 8 is secured to the LP shaft 9.

Further upstream, the inter-shaft bearing P4 comprises a cage with rolling bearings which is mounted between an inner raceway secured to the LP shaft 9 and an outer raceway secured to a journal 10C1 at the end of the HP spool 10C and, more specifically, attached to a flange of the HP turbine disk 7.

One embodiment of the invention, which is derived from the bearing arrangement of the prior art illustrated in FIG. 2, will now be described with reference to FIG. 3.

Figure 3:
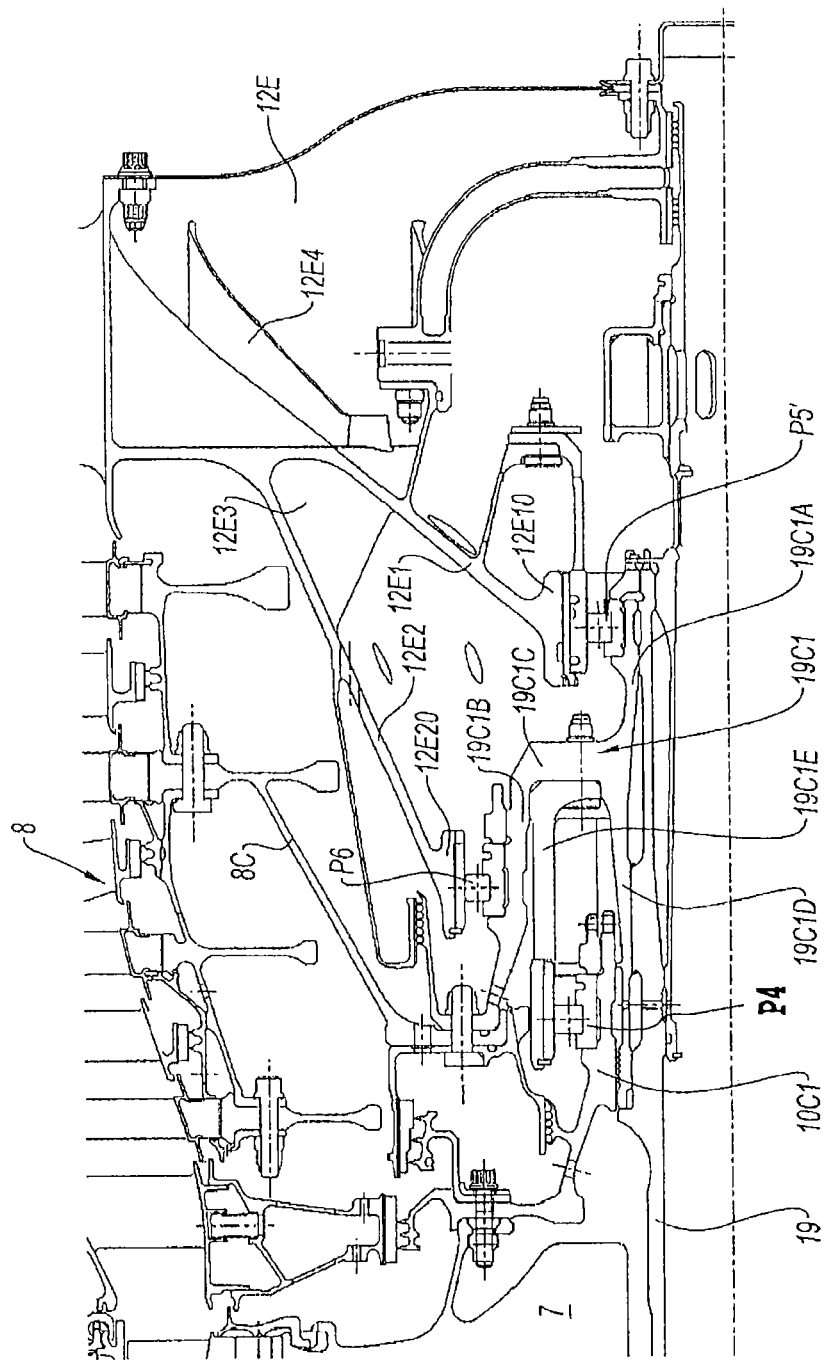
FIG. 3 is an axial half section of the rear part of the engine comprising an additional downstream LP bearing according to the invention.

In this FIG. 3, the HP and LP turbines 7 and 8 respectively are unchanged with respect to FIG. 2. The LP shaft is referenced 19. On its downstream end side it has a journal 19C1 which here is an attached journal but which could also be of one piece with the LP shaft. The journal comprises a part 19C1A which is in the continuation of the LP shaft 19 and of substantially the same diameter. It comprises another part 19C1B, of greater diameter, attached by a radial portion 19C1C to the first part 19C1A of the journal.

The hub of the exhaust casing 12E comprises two frustoconical portions 12E1 and 12E2 forming supports for two bearings P5' and P6 respectively. The bearing P5' is positioned between the part 19C1A of the journal of the LP shaft 19 and the frustoconical portion 12E2. It comprises a rolling-bearing cage mounted between an inner raceway or ring secured to the journal part 19C1A and an outer raceway or ring secured to a cylindrical continuation 12E10 of the frustoconical portion 12E1 of the exhaust casing hub.

The bearing P6 is mounted between the larger-diameter cylindrical part 19C1B of the journal 19C1 and a cylindrical continuation 12E20 of the frustoconical portion 12E2 of the exhaust casing hub. Stiffening ribs, in radial longitudinal planes 12E3 and distributed about the axis of the engine, are formed between the two frustoconical portions to improve the resistance to the radial forces to which these two frustoconical portions are subjected at their upstream end. The hub also comprises longitudinal and radial ribs 12E4 distributed about the axis of the engine.

The journal 19C1 comprises a cylindrical portion 19C1D extending the cylindrical portion 19C1A upstream and slipped over exterior bearing surfaces of the shaft 19. The inter-shaft bearing P4 is housed in the annular space between the two cylindrical portions 19C1B and 19C1D. This bearing comprises a rolling-bearing cage mounted between a raceway or ring secured to the journal 1001 situated at the downstream end of the HP rotor 10C and an outer raceway or ring secured to a ring 19C1E, which is itself mounted on the journal 19C1 inside the cylindrical portion 19C1B.

As can be seen in FIG. 3, the journal 10C1 is fixed to a downstream flange of the HP turbine disk 7. The journal 19C1 of the LP shaft 19 is bolted, by a radial flange external to the cylindrical portion 19C1B, to a cone 8C attached to one of the disks of the LP turbine rotor 8. The LP turbine rotor here is made up of four turbine disks assembled into a single turbine unit.

Figure 4:
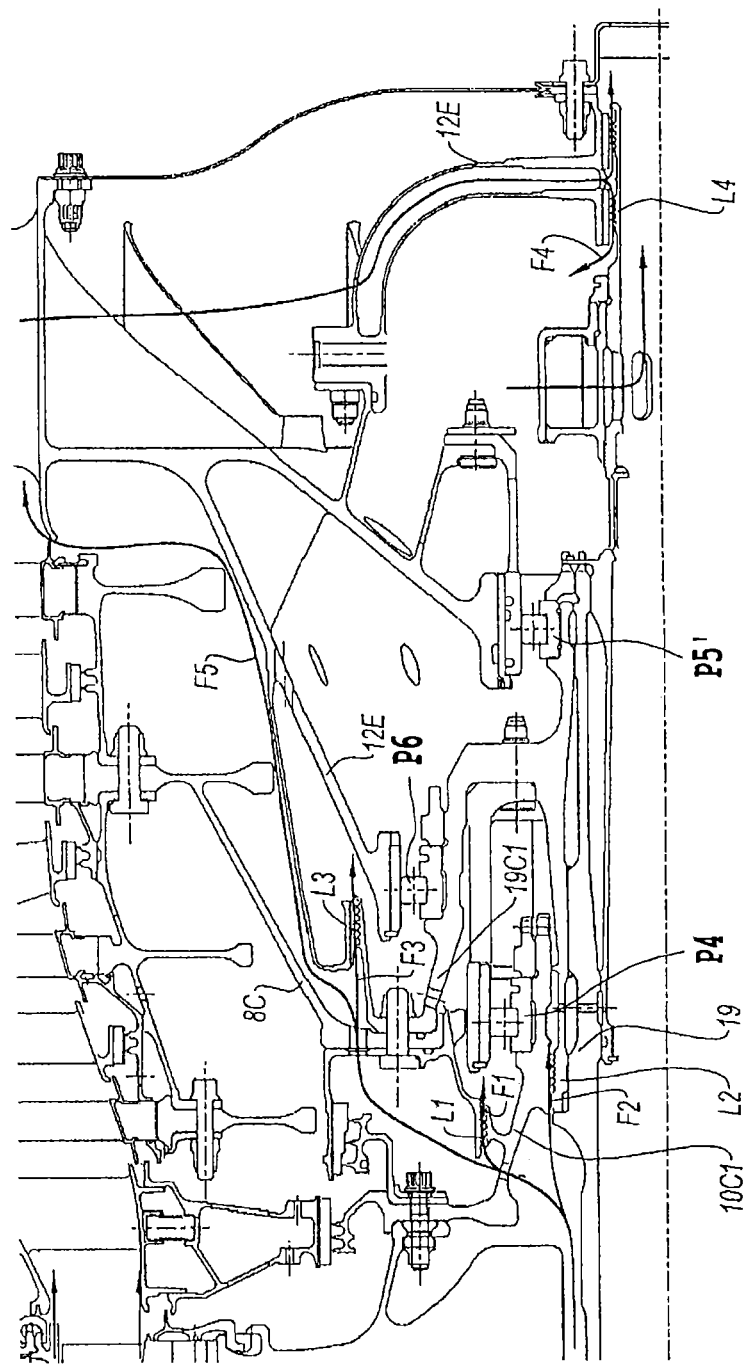
FIG. 4 depicts the circulation of bearing chamber ventilation air according to the invention.

The lubrication is shown in FIG. 4. A chamber for lubrication oil is formed by labyrinth fields positioned between the parts that move relative to one another.

Thus, on the upstream side of the set of bearings P4, P5' and P6, there are labyrinth seals L1 between the journal 10C1 of the HP rotor and the HP shaft 10, L2 between the journal 10C1 and the journal 19C1 of the LP shaft 19, L3 between the cone 8C of the LP turbine rotor and the hub of the exhaust casing 12E. On the downstream side, the labyrinth seal L4 closes the chamber between the LP shaft 19 and the hub of the exhaust casing 12E.

The arrows F1, F2, F3, F4 and F5 illustrate the flow of pressurizing air bled off upstream and by means of which the bearing chamber is kept pressurized in relation to the pressure obtaining in the low-pressure turbine stages. The oil admitted by appropriate ducts is sprayed over the rolling bearings in a way known per se and is removed via the inside of the LP shaft 19 which comprises an oil separator that has not been depicted.

This version seeks to keep the components that already exist in engines of the prior art so that the least possible amount of modification is needed. In particular, the inter-shaft bearing P4 is mounted on the journal 10C1 which has not been modified. The bearing P4 is thus upstream of the bearing P6.

Figure 5:
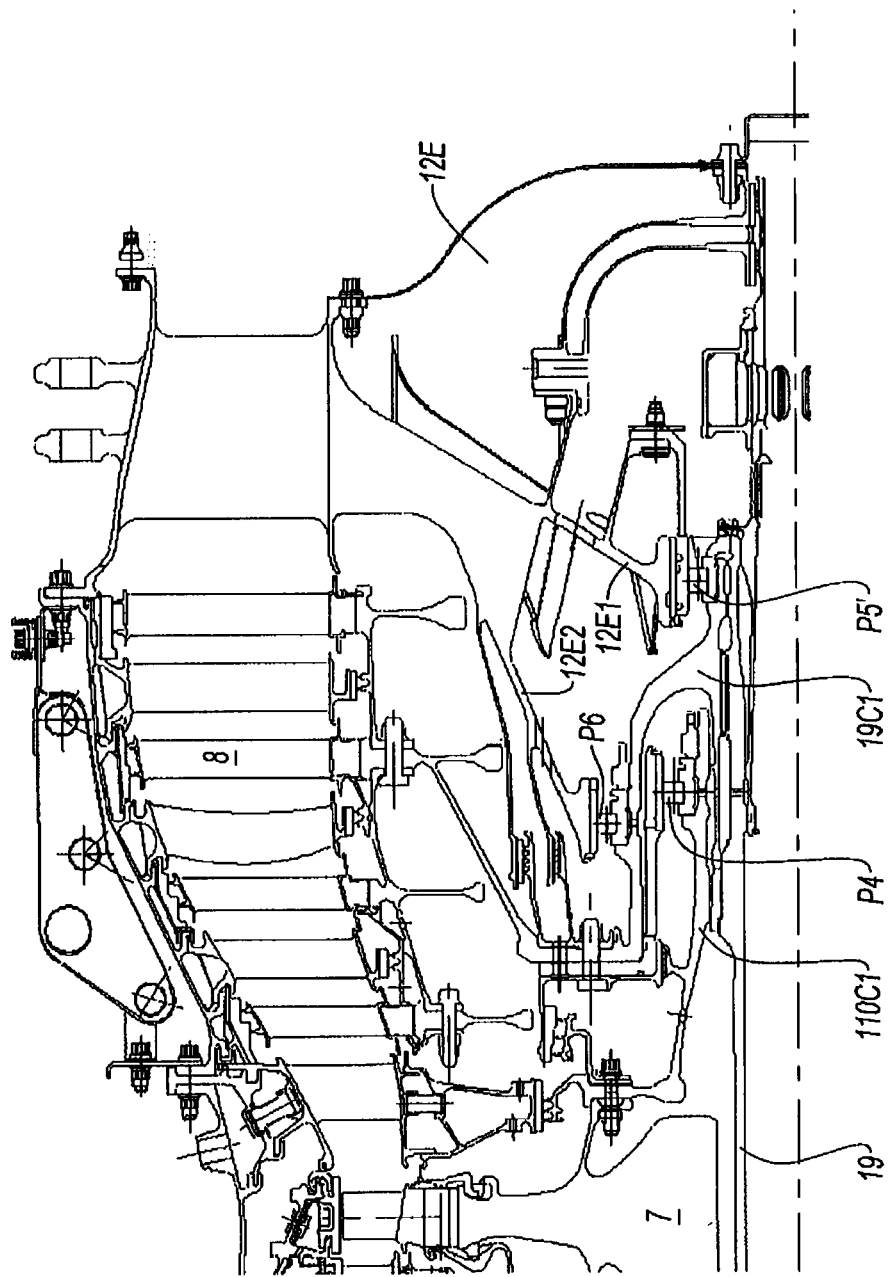
FIG. 5 depicts an alternative layout of the bearings according to the invention.

According to an alternative form of embodiment depicted in FIG. 5, the bearing P4 is moved further downstream so that it lies substantially in the same transverse plane as the bearing P6. To do this, the journal at the end of the HP rotor is lengthened. This journal is referenced 110C1 in FIG. 5. The journal of the LP shaft is also modified by comparison with the solution of FIG. 3.

The solution of the invention is advantageous over the prior art in which the HP turbine journal is positioned externally with respect to the inter-shaft bearing.

In the latter instance, because the running speed of the HP turbine is greater than that of the LP turbine shaft mounted on the inside, this component is caused to expand.

In order to guarantee normal operating clearances for the inter-shaft rolling bearing, this bearing has to be mounted constrained between the LP turbine shaft and the HP turbine journal.

On assembly, as the LP turbine mates with its shaft on the HP spool module, the HP turbine journal fitted with the outer ring of the rolling bearing has to be heated to cause it to expand and allow the fitting of the LP turbine shaft fitted with the inner ring and with the rolling bodies of this same rolling bearing. Assembly is awkward.

With the solution of the invention, the HP turbine journal is positioned further toward the inside than the inter-shaft bearing and the LP turbine shaft further toward the outside of this same rolling bearing.

Thus, unlike an assembly of the type used in the prior art, the LP turbine fitted with its shaft, itself fitted with the outer ring of the inter-shaft rolling bearing, is mated with the HP turbine journal fitted with the inner ring and with the rolling bodies of the bearing, with clearance. There is therefore no need to heat the HP turbine journal. Assembly is thereby made easier. The clearance in the cold state is calculated to guarantee correct operation of the rolling bearing, according to the mechanical and thermal stresses of the whole and with due consideration to the fact that the running speed of the HP turbine journal is greater than that of the LP turbine shaft.

The invention claimed is:

1. A twin-spool gas turbine engine comprising:
    a low-pressure LP spool and a high-pressure HP spool, which spools are mounted so as to rotate about a same axis in a fixed casing,
    the low-pressure LP spool including a compressor and a turbine which are connected by a low-pressure LP shaft, the low-pressure LP shaft being supported by an upstream LP bearing, a first downstream LP bearing, and a second downstream LP bearing by the fixed casing,
    the high-pressure HP spool being supported by an upstream HP bearing and a downstream HP bearing,
    wherein the first downstream LP bearing is positioned between first portion of a journal at a downstream end of the LP shaft and a first portion of a hub of an exhaust casing,
    wherein the second downstream LP bearing is positioned between a second portion of the journal of the LP shaft and a second portion of the hub of the exhaust casing,
    wherein an outer diameter of the second portion of the journal is greater than an outer diameter of the first portion of the journal, and an inner diameter of the second portion of the hub of the exhaust casing is greater than an inner diameter of the first portion of the hub of the exhaust casing,
    wherein the downstream HP bearing is an inter-shaft bearing comprising an inner raceway secured to an HP turbine rotor and an outer raceway secured to the LP shaft,
    wherein a radial position of the downstream HP bearing is between a radial position of the first downstream LP bearing and a radial position of the second downstream LP bearing, and
    wherein the second downstream LP bearing is located upstream of the first downstream LP bearing.

2. The engine as claimed in claim 1, wherein the second downstream LP bearing is positioned axially between the downstream HP bearing and the first downstream LP bearing.

3. The engine as claimed in claim 1, wherein the downstream HP bearing and the second downstream LP bearing are positioned in respective planes that are transverse with respect to the axis of the engine and are close to one another.

4. The engine as claimed in claim 1, wherein the exhaust casing includes radial-stiffening means.

5. The engine as claimed in claim 1, wherein the first portion of the hub and the second portion of the hub are frustoconical.

6. The engine as claimed in claim 1, wherein a first labyrinth seal is provided on an upstream side of the downstream HP bearing between a journal of the HP turbine rotor and an HP shaft.

7. The engine as claimed in claim 6, wherein a second labyrinth seal is provided on the upstream side of the downstream HP bearing between the journal of the HP turbine rotor and the LP shaft.

8. The engine as claimed in claim 7, wherein a third labyrinth seal is provided on the upstream side of the second downstream LP bearing between a cone of the LP shaft and the hub of the exhaust casing.

9. The engine as claimed in claim 8, wherein a fourth labyrinth seal is provided on a downstream side of the first downstream LP bearing between the LP shaft and the hub of the exhaust casing.

* * * * *

UNITED STATES PATENT AND TRADEMARK OFFICE
CERTIFICATE OF CORRECTION

PATENT NO. : 8,919,133 B2  
APPLICATION NO. : 13/260152  
DATED : December 30, 2014  
INVENTOR(S) : Jacques Rene Bart et al.

It is certified that error appears in the above-identified patent and that said Letters Patent is hereby corrected as shown below:

Title Page

Item (75) Inventors, change "Didler René" to --Didier René--;

In the Specification

Column 1, line 15, change "low-pressure (BP)" to --low-pressure (LP)--;

Column 3, line 17, change "intermediate casing 21" to --intermediate casing 2I--;

Column 3, line 29, change "intermediate casing 21" to --intermediate casing 2I--;

Column 4, line 21, change "journal 1001" to --journal 10C1--; and

In the Claims

Column 6, line 9, claim 1, change "LP shaft," to --LP shaft, and--.

Signed and Sealed this  
Eighteenth Day of August, 2015

Michelle K. Lee  
*Director of the United States Patent and Trademark Office*